Dec. 15, 1936.  J. F. MOSE  2,064,353
SAW FILING MACHINE
Filed April 10, 1935  2 Sheets-Sheet 1
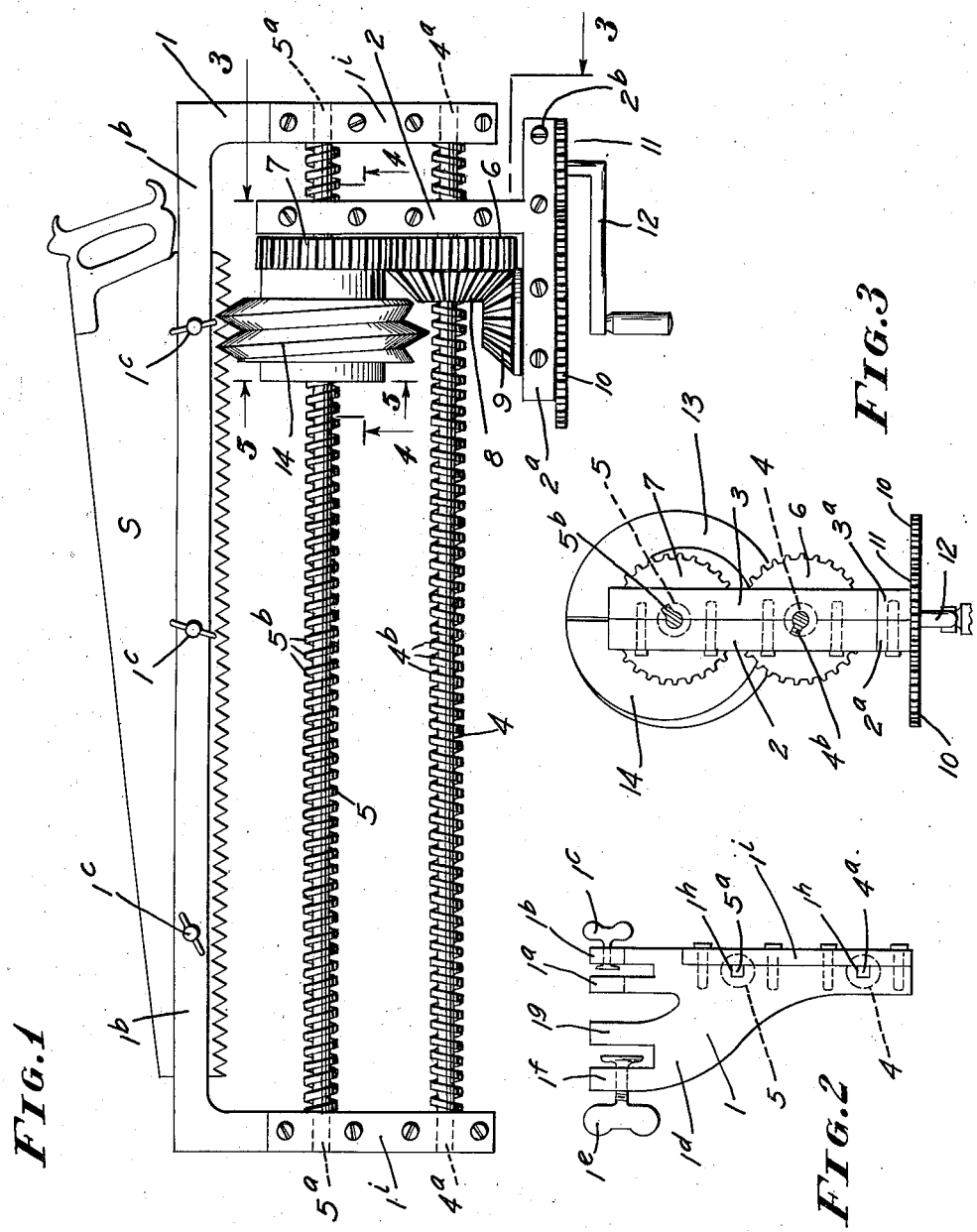
INVENTOR
Josef F. Mose
BY
A. B. Bowman
ATTORNEY Dec. 15, 1936.  J. F. MOSE  2,064,353
SAW FILING MACHINE
Filed April 10, 1935   2 Sheets-Sheet 2
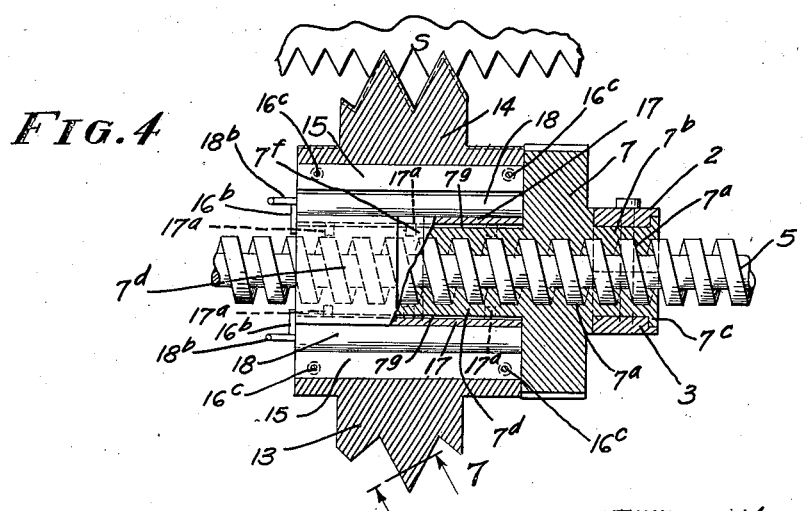
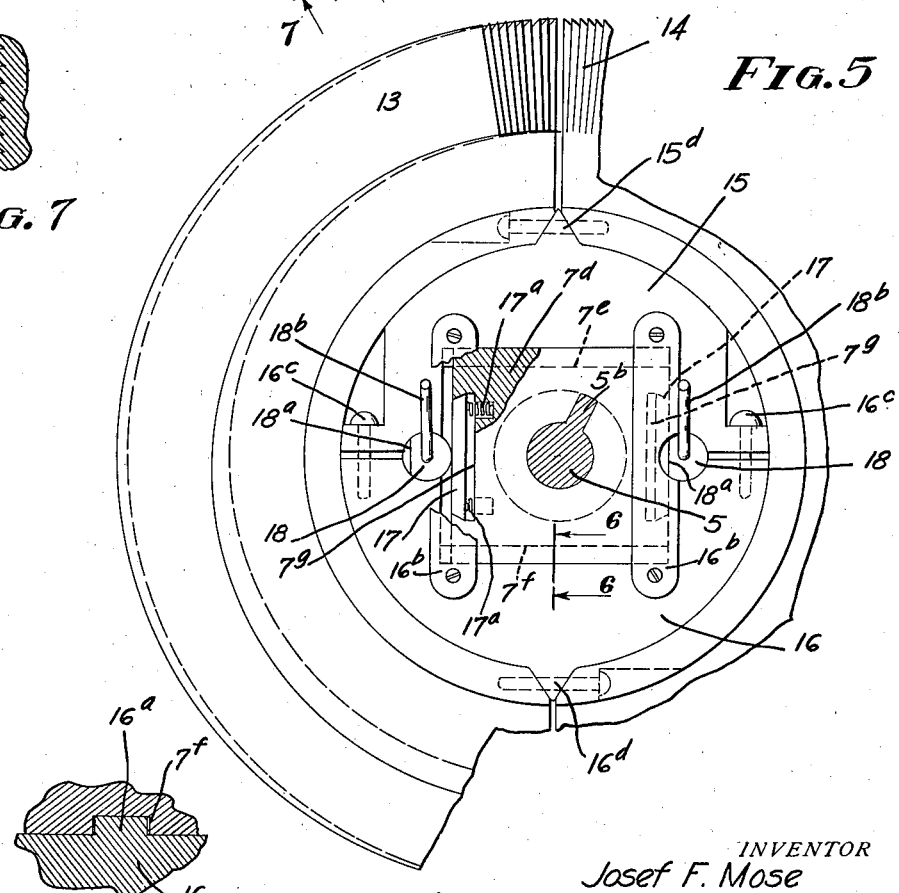
INVENTOR
Josef F. Mose
BY A. B. Bowman
ATTORNEY Patented Dec. 15, 1936

2,064,353

UNITED STATES PATENT OFFICE 2,064,353

SAW FILING MACHINE

Josef F. Mose, Point Loma, Calif., assignor of forty-five per cent to Alfred Krause, Point Loma, Calif.

Application April 10, 1935, Serial No. 15,584

7 Claims. (Cl. 76—38)

My invention relates to a machine for filing saws, and the objects of my invention are:

First, to provide a machine for filing saws which will file the teeth accurately and symmetrically throughout the length of the saw blade;

Second, to provide a device of this class which will file the teeth very rapidly;

Third, to provide a machine of this class which files one side of the teeth in the movement in one direction and the other side in the reverse movement;

Fourth, to provide a machine of this class in which the saw is readily clamped in position and rigidly held in position for filing the teeth;

Fifth, to provide a machine of this class with which any amateur can readily file a saw satisfactorily;

Sixth, to provide a machine of this class in which the filing motion is rotary in connection with the saw teeth;

Seventh, to provide a device of this class in which different shaped files may be quickly changed for different shaped saw teeth; and Eighth, to provide a saw filing machine of this class which is very simple and economical of construction, easy to operate, efficient in its action and which will not readily deteriorate or get out of order.

With these and other objects in view as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Figure 1 is a top or plan view of my saw filing machine complete and showing the saw in position ready to be filed; Fig. 2 is an end view thereof; Fig. 3 is a sectional view through 3—3 of Fig. 1; Fig. 4 is a sectional view on an enlarged scale through 4—4 of Fig. 1; Fig. 5 is a sectional view on a still larger scale through 5—5 of Fig. 1; Fig. 6 is a sectional view through 6—6 of Fig. 5, and Fig. 7 is an enlarged view of the saw teeth in their relation to the action of rotation shown diagrammatically in section.

Similar characters of reference refer to similar parts and portions throughout the several views of the drawings.

Stationary frame member 1, shiftable frame members 2 and 3, threaded shafts 4 and 5, gear 6, gear 7, bevel gear 8, pinion 9, gears 10 and 11, handle 12, rotary file members 13 and 14, rotary file member supports 15 and 16, yieldable plates 17, and file shifting cam members 18, constitute the principal parts and portions of my saw filing machine.

The frame member 1 consists of two longitudinal bars 1a and 1b which are of sufficient length to hold the saw blade, as shown best in Fig. 1 of the drawings, and they are spaced a sufficient distance apart to permit the saw to be inserted in the open space between the members 1a and 1b, then the saw is secured by means of the clamp members 1c which are screwed into the member 1b and are provided with flange portions adapted to engage the flat side of the saw blade and clamp the same against the member 1a. At each end of the members 1a and 1b are provided the end members which are extended at right angles to the members 1a and 1b some distance on a horizontal plane and secured intermediate the ends of this extended portion and preferably integral therewith is a clamp portion 1d which is provided with a clamp member 1e which is screwthreaded in a portion 1f and is provided with a flange which is adapted to extend toward an extended portion 1g for supporting the frame member in position on a horizontal plane. The extended portion is provided with square recesses 1h in the one side which are adapted to receive the square ends 4a and 5a of the threaded shafts 4 and 5 and there are provided plates 1i which are supported over these shafts 4 and 5, as shown best in Fig. 2 of the drawings, thus securing these shafts in position on the extended portions of the member 1.

These shafts 4 and 5 are preferably provided with square threads 4b and 5b which provide the feed members for the rotary file members. Thus it will be noted that the shafts 4 and 5 are supported in the frame member 1 so that they will not turn by means of the square portions 4a and 5a mounted in the conforming recesses 1h in the frame member 1, all as shown best in Fig. 2 of the drawings.

Mounted on the shaft 5 is a gear member 7 which is provided with an internal thread 7a which is adapted to fit the threads 5b on the shaft 5 so that when the gear 7 is turned on said shaft the gear 7 will move in one direction and when the gear is turned in the opposite direction it will move in the opposite direction along said shaft. This gear 7 is provided with an extended portion 7b which is provided with an enlarged flange portion 7c at its outer end, shown best in Fig. 4 of the drawings. These portions 7b and 7c are adapted to fit in conforming portions in the two frame members 2 and 3, as shown best in Fig.

3 of the drawings, and these frame members 2 and 3 are thus moved longitudinally along the shafts 4 and 5 with the gear 7. On the opposite side of the main portion of the gear 7 from the portion 7b is a substantially square shaped portion 7d which extends along the shaft 5 for some distance and which is also internally threaded adapted to fit the threads 5b on the shaft 5. This portion 7d is provided with two grooves 7e and 7f in its opposite sides and it is also provided with grooves 7g, shown best in Fig. 5 of the drawings, in which are mounted plates 17 which plates are provided with beveled edges adapted to conform to the beveled sides of the recesses 7g. These plates 17 are held outwardly in the slots 7g by means of springs 17a mounted in recesses in the member 7d thus providing yieldable means to permit slight movement of the rotary file dependent upon the pressure of the file on the saw blade.

Mounted on the substantially square portion 7d of the gear member 7 are the rotary file member supports 15 and 16 which are provided with conjoined recesses at their central portions when connected to provide a conforming recess to the square portion 7d except that it is longer one way than the other to permit the supports 15 and 16 to shift transversely a slight distance, as will be hereinafter described. These members 15 and 16 are provided with tongue portions 16a, shown best in Fig. 6 of the drawings, adapted to fit in the grooves 7e and 7f of the member 7d to prevent the longitudinal shifting of the members 15 and 16 relative to the member 7d. Mounted over the open ends of the slots 7g in the member 7d are cover plates 16b, shown in Fig. 5 of the drawings, which cover the ends of the slots and also hold the plates 17 in position in the slots 7g.

Revolubly mounted at the intersection of the members 15 and 16 and adjacent the member 7d and adapted to engage the plates 17 are cam shafts 18 which are provided with flat sides 18a thus providing means for shifting the members 15 and 16 transversely on the member 7d and holding them in such shifted relation. These cam members 18 are each provided with handles 18b to facilitate their turning.

The members 15 and 16 are held together by means of bolts 16c, shown best in Fig. 5 of the drawings. These members 15 and 16 are also provided with V-shaped lug portions 15d and 16d which are adapted to hold the file members 13 and 14 in slightly spaced relation, as shown best in Fig. 5 of the drawings. These members 13 and 14 are secured to the members 15 and 16 by means of bolts passing through these lug portions 15d and 16d and into the adjacent file member, as shown best in Fig. 5 of the drawings, thus rigidly supporting the members 13 and 14 on the members 15 and 16 in slightly spaced relation, as shown.

The file members 13 and 14 are each slightly eccentric from the center of the two gear members when in their secured relation but are concentric with the inner lines of the gears, thus when the members 15 and 16 together with the members 13 and 14 are shifted sideways in either direction they have eccentric axes of rotation, thus providing for throwing one of the members, for instance the member 13, out of engagement with the saw teeth while the member 14 will be in engagement to a greater extent at its middle portion during its one-half revolution and the file teeth on the members 13 and 14 are directed in opposing relation, as shown best in Fig. 5 of the drawings, so that when the file members are revolved on the shaft 5 and are fed along said shaft longitudinally, one of the members 13 or 14 will engage one side of the teeth while the other member will not be in engagement. Then when the opposite end of the saw blade is reached the saw is reversed end for end and the other file member is shifted into engagement with the space between the teeth of the saw blade and the action is reversed and the file member moves longitudinally on the shaft 5 in the opposite direction, thus filing both sides of the teeth in the backward and forward movement of the file members on the shaft 5. This is accomplished by means of a gear 6 which is similar to the gear 7 and of the same fixed diameter. This gear 6 is also provided with an extended and flanged portion similar to the extended and flanged portions 7b and 7c on the gear 7 and engages similar recesses in the members 2 and 3 so that the gears 6 and 7 move along the shafts 4 and 5 and are fed thereon by means of the threads 4b and 5b. The gear 6 however is provided with a bevel portion 8 which meshes with a bevel pinion 9 which is journaled by means of a shaft extending through between the flanges 2a of the member 2 and 3a of the member 3 and mounted on this shaft of the bevel pinion 9 on the opposite side of the flanges 2a and 3a is a spur gear 10 which meshes with another spur gear 11 journaled in the flanges 2b of the member 2 and meshing with the gear 10. This gear 11 is provided with a handle member 12 to facilitate the turning of said gear 11.

The operation of my saw filing machine is as follows: The saw is clamped between the members 1a and 1b by means of the clamp screws 1c, as shown best in Fig. 1 of the drawings, and with the file member 14 in engagement with the slots between the saw teeth, the file members being shifted so that only one of these members engages the slots. Then the handle 12 is turned and the rotary file member 13 files the saw teeth on one side proceeding in rotary movement along the shafts 4 and 5 to the opposite end. After which the cam members 18 are turned so that the member 14 is shifted into engagement with the saw teeth with the saw in reversed position and the member 13 is clear. The handle is operated in reverse direction and the rotary member 13 files the teeth on the opposite side until it reaches the opposite end of the saw blade which finishes the operation.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a saw filing machine, a frame member adapted to receive a saw longitudinally therein, a threaded shaft secured in said frame, a rotary file member revolubly mounted around said shaft adapted to feed along said shaft and engage the slots between the saw teeth of the saw and threaded means mounted on said rotary file and cooperating with said threaded shaft to feed said rotary file along said shaft.

2. In a saw filing machine, a frame member provided with longitudinally disposed spaced bars used for clamping a saw between said bars, a pair of spaced equally threaded shafts disposed in parallel relation with said saw clamping portion of said frame, intermeshing internally threaded gears of equal fixed diameter threaded on said shafts, means for revolving one of said gears, and a rotary file member mounted in secured relation with the other of said gears arranged to engage the saw teeth.

3. In a saw filing machine, a frame member provided with longitudinally disposed spaced bars used for clamping a saw between said bars, a pair of spaced equally threaded shafts disposed in parallel relation with said saw clamping portion of said frame, intermeshing internally threaded gears of equal fixed diameter threaded on said shafts, means for revolving one of said gears, a rotary file member mounted in secured relation with the other of said gears arranged to engage the saw teeth, said file member being eccentric, and means for shifting said file member in relation with said gear and shaft whereby one-half only of said file member engages the saw file teeth when said rotary file revolves on said shaft.

4. In a saw filing machine, a frame member provided with longitudinally disposed spaced bars adapted to receive a saw blade, clamping members positioned in one of said bars adapted to clamp the saw blade between said bars, a pair of spaced threaded shafts disposed in parallel relation with said spaced bars, intermeshing internally threaded gears threaded on said shafts, means for revolving one of said gears, and a rotary file member mounted in secured relation with the other of said gears arranged to engage the saw teeth.

5. In a saw filing machine, a frame member provided with longitudinally disposed spaced bars adapted to receive a saw blade, clamping members positioned in one of said bars adapted to clamp the saw blade between said bars, a pair of spaced threaded shafts disposed in parallel relation with said spaced bars, intermeshing internally threaded gears threaded on said shafts, means for revolving one of said gears, and a rotary file member mounted in secured relation with the other of said gears arranged to engage the saw teeth, said file member being eccentrically positioned in relation with the shaft upon which it is mounted.

6. In a saw filing machine, a frame member provided with longitudinally disposed spaced bars adapted to receive a saw blade, clamping members positioned in one of said bars adapted to clamp the saw blade between said bars, a pair of spaced threaded shafts disposed in parallel relation with said spaced bars, intermeshing internally threaded gears threaded on said shafts, means for revolving one of said gears, a rotary file member mounted in secured relation with the other of said gears arranged to engage the saw teeth, said file member being eccentrically positioned in relation with the shaft upon which it is mounted, and means for shifting said rotary file transversely to said shaft.

7. In a saw filing machine, a frame member provided with longitudinally disposed spaced bars adapted to receive a saw blade, clamping members positioned in one of said bars adapted to clamp the saw blade between said bars, a pair of spaced threaded shafts disposed in parallel relation with said spaced bars, intermeshing internally threaded gears threaded on said shafts, means for revolving one of said gears, a rotary file member mounted in secured relation with the other of said gears arranged to engage the saw teeth, said file member being eccentrically positioned in relation with the shaft upon which it is mounted, means for shifting said rotary file transversely to said shaft, and yieldable means in connection with said shiftable means to permit slight movement of said rotary file dependent upon pressure of said file on the saw blade.

JOSEF F. MOSE.